United States Patent
Pham et al.

(10) Patent No.: US 10,198,924 B1
(45) Date of Patent: Feb. 5, 2019

(54) TRANSACTION TERMINAL SILENT ALERT SYSTEMS

(71) Applicant: Capital One Services, LLC, McLean, VA (US)

(72) Inventors: Vincent Pham, Champaign, IL (US); Kenneth Taylor, Champaign, IL (US); Fardin Abdi Taghi Abad, Champaign, IL (US); Anh Truong, Champaign, IL (US); Jeremy Goodsitt, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/020,347

(22) Filed: Jun. 27, 2018

(51) Int. Cl.
| | | |
|---|---|---|
| G08B 15/00 | (2006.01) | |
| G06F 21/32 | (2013.01) | |
| G06K 9/00 | (2006.01) | |
| G07F 19/00 | (2006.01) | |
| G08B 25/00 | (2006.01) | |

(52) U.S. Cl.
CPC ........... *G08B 15/001* (2013.01); *G06F 21/32* (2013.01); *G06K 9/00087* (2013.01); *G07F 19/207* (2013.01); *G08B 25/00* (2013.01)

(58) Field of Classification Search
CPC .......................... G08B 15/001; G06K 9/00087
USPC ....................................................... 340/5.82
See application file for complete search history.

(56) References Cited

U.S. PATENT DOCUMENTS

| | | |
|---|---|---|
| 6,948,077 B1 | 9/2005 | Pitale |
| 9,218,474 B1 * | 12/2015 | Roth ....................... G06F 21/32 |
| 2002/0038818 A1 | 4/2002 | Zingher et al. |
| 2004/0168067 A1 | 8/2004 | Russikoff |
| 2008/0251578 A1 | 10/2008 | Jansing |

FOREIGN PATENT DOCUMENTS

WO     WO 00/54195 A1     9/2000

* cited by examiner

*Primary Examiner* — Vernal U Brown
(74) *Attorney, Agent, or Firm* — Troutman Sanders LLP; Christopher J. Forstner; John A. Morrissett

(57) ABSTRACT

A transaction terminal silent alarm system having processor(s) and memory storing instructions that, when executed by the processor(s), cause the system to perform a method is disclosed. Upon receiving, from a user device, an authentication request to complete a transaction at a transaction terminal, the system may determine whether a fingerprint scan matches a stored fingerprint. Responsive to the fingerprint scan matching a stored normal fingerprint and absent receiving another fingerprint that matches a stored cancellation fingerprint, the system may direct the transaction terminal to complete the transaction. Responsive to the fingerprint scan matching a stored under-duress fingerprint, the system may direct the transaction terminal to send a silent alert to law enforcement and direct the transaction terminal to delay the transaction. Responsive to the fingerprint scan not matching any stored fingerprints, the system may direct the user device to display a fingerprint rescan message.

20 Claims, 4 Drawing Sheets

TRANSACTION TERMINAL SILENT ALERT SYSTEMS

FIELD OF THE INVENTION

The presently disclosed subject matter relates generally to systems and methods for providing a silent automated teller machine ("ATM") and point-of-sale ("POS") terminal alert system, more particularly systems and methods utilizing fingerprint scans for determining when a transaction is being conducted under duress, triggering a silent alarm and altering the transaction process for an under-duress transaction, and allowing a user to cancel the silent alarm in response to a false alarm.

BACKGROUND

The advent of the automated teller machine ("ATM") has made it possible for banking withdrawals to be made without interacting with a human bank teller. For example, a user may use an ATM to make withdrawals or deposits from a checking or savings account and to determine an account balance. Point-of-sale ("POS") terminals and systems use a similar technology to directly debit a user's bank account enabling users to make purchases of goods (e.g., gasoline, groceries, consumer electronics, etc.) or services (e.g., car cleaning, yoga class, etc.).

To withdraw funds from an ATM, a user typically presents (e.g., scans, swipes, or inserts) an identification card that was issued by an associated financial service provider and enters a personal identification number ("PIN") that is stored in a secure database. Upon successful entry of the PIN associated with the presented identification card, the ATM prompts the user to select an associated financial account and perform one or more preset tasks (e.g., withdrawing funds, checking an account balance, etc.).

While helpful in securely and efficiently withdrawing funds from an ATM or conducting a transaction at a POS terminal for most situations, the transaction authorization process described above has some limitations. For example, a user may be forced to enter or divulge his or her identifying PIN to a third party when the third party threatens or pressures the user to conduct a transaction on the third party's behalf.

Accordingly, there is a need for improved alert systems for identifying and responding to transactions being made under duress at a transaction terminal (e.g., ATM or POS terminal). Embodiments of the present disclosure are directed to this and other considerations.

SUMMARY

Disclosed embodiments provide systems and methods for providing a silent transaction terminal alert system.

Consistent with the disclosed embodiments, a transaction terminal silent alarm system may include one or more processors and a memory in communication with the one or more processors and storing instructions that, when executed by the one or more processors, are configured to cause the system to perform steps of a method for triggering a silent alert for an under-duress transaction at a transaction terminal. As a user electing, either by choice or under duress, to conduct a transaction (e.g., withdraw funds) at a transaction terminal (e.g., an ATM or POS terminal) initiates the transaction process using his or her user device (e.g., mobile phone), the system may receive, from a user device, an authentication request to complete the transaction at the transaction terminal. The authentication request may include a fingerprint scan (or another biometric identifier used in lieu of or in addition to a financial service provider issued card) obtained via the user device and financial account data for a financial account associated with the user device. The system may determine whether the fingerprint scan matches, beyond a predetermined confidence threshold, one of a plurality of stored fingerprints associated with the user device (e.g., one or more stored fingerprint scans of the user's index finger, ring finger, and pinky finger associated with the user and user device). The plurality of stored fingerprints includes a stored normal fingerprint scan (e.g., left and/or right index finger), a stored under-duress fingerprint scan (e.g., left and/or right ring finger) for triggering an under-duress transaction signal, and a stored cancellation fingerprint scan (e.g., left and/or right pinky finger) for cancelling the under-duress transaction signal. A group of one or more fingerprints (e.g., left and right index finger) may be assigned to exactly one type of fingerprint scan (e.g., normal, under-duress, or cancellation fingerprint scan). The system may (1) determine that the fingerprint scan matches the stored normal fingerprint scan and direct the transaction terminal to complete the transaction in response. Alternatively, the system may (2) determine that the fingerprint scan matches the stored under-duress fingerprint scan and, in response, direct the transaction terminal to delay the transaction a predetermined cancellation time period within which the under-duress transaction signal can be cancelled. For example, the system may wait 15 seconds after receiving a fingerprint scan associated with the under-duress transaction signal before taking further action to allow the user to scan another fingerprint (e.g., of the user's pinky finger) to cancel the under-duress transaction signal. In response to receiving a subsequent fingerprint scan (e.g., of the user's pinky finger) from the user device within the cancellation time period, the system may determine whether the subsequent fingerprint scan matches the stored cancellation fingerprint scan beyond the predetermined confidence threshold. Based on this determination (e.g., upon determining that the subsequent scan matches the user's stored pinky finger scan), the system may direct the transaction terminal to complete the transaction and direct the user device to display an under-duress transaction signal cancellation message. However, in response to not receiving the subsequent fingerprint scan within the predetermined cancellation time period, the system may (a) direct the transaction terminal to delay the transaction for a predetermined wait time (e.g., 3 minutes or a customized wait time determined by the system) before completing the transaction and (b) send an alert notification to law enforcement. Alternatively, the system may (3) determine that the fingerprint scan does not match one of the stored fingerprints and in response, direct the user device to display a fingerprint rescan message.

Consistent with the disclosed embodiments, methods for triggering a silent alert for an under-duress transaction at a transaction terminal are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
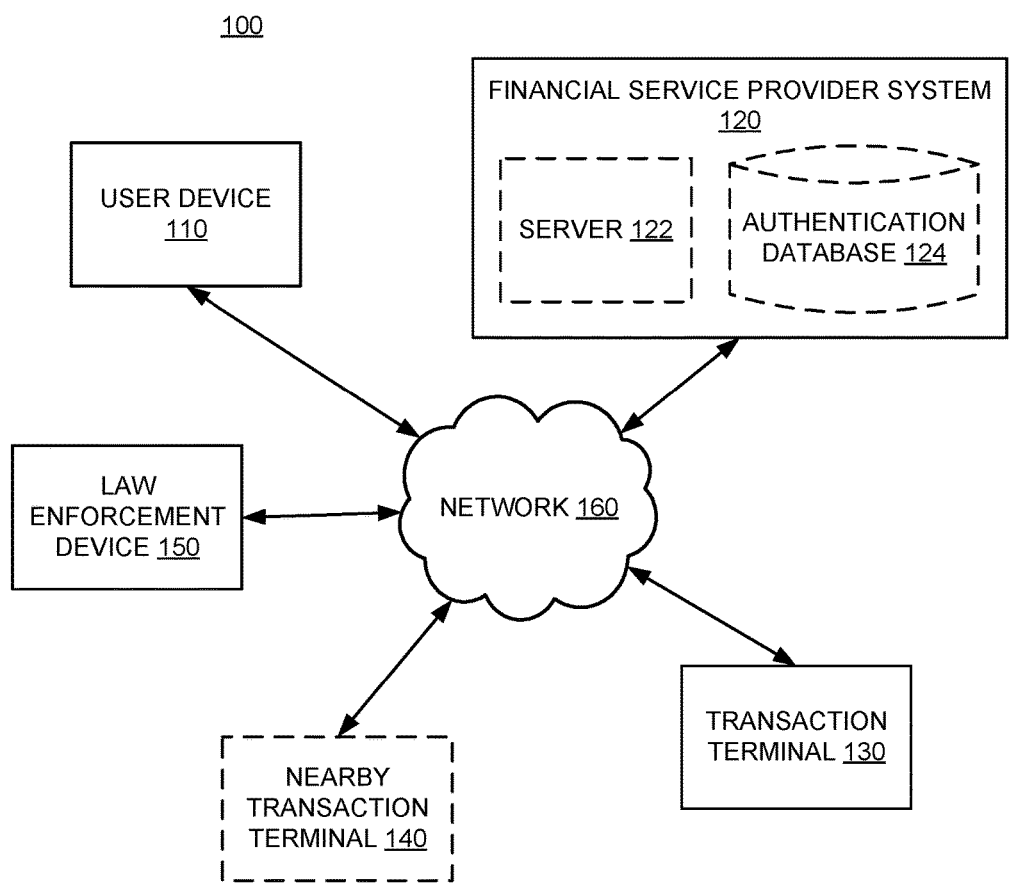
FIG. 1 is a diagram of an exemplary system that may be used for providing a silent transaction terminal (e.g., ATM or POS terminal) alert.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing a silent alert in response to a transaction being made under duress at a transaction terminal (e.g., an ATM or POS terminal). In one aspect, a transaction terminal silent alarm system is disclosed. Specifically, the system may include one or more processors and a memory in communication with the processor(s) and storing instructions that, when executed by the processor(s), are configured to cause the system to perform the steps of a method. For example, the system may receive, from a user device, an authentication request to complete a transaction at a transaction terminal. The authentication request may include a fingerprint scan obtained via the user device and financial account data for a financial account associated with the user device. The system may determine whether the fingerprint scan matches, beyond a predetermined confidence threshold, one of a plurality of stored fingerprints associated with the user device. The plurality of stored fingerprints may include a stored normal fingerprint scan, a stored under-duress fingerprint scan for triggering an under-duress transaction signal, and a stored cancellation fingerprint scan for cancelling the under-duress transaction signal. The system may (1) determine that the fingerprint scan matches the stored normal fingerprint scan and direct the transaction terminal to complete the transaction in response. Alternatively, the system may (2) determine that the fingerprint scan matches the stored under-duress fingerprint scan and, in response, the system may direct the transaction terminal to delay the transaction a predetermined cancellation time period within which the under-duress transaction signal can be cancelled. In response to receiving a subsequent fingerprint scan from the user device falling within the cancellation time period, the system may determine whether the subsequent fingerprint scan matches the stored cancellation fingerprint scan beyond the predetermined confidence threshold. Based on this determination, the system may direct the transaction terminal to complete the transaction and direct the user device to display an under-duress transaction signal cancellation message. In response to not receiving the subsequent fingerprint scan within the predetermined cancellation time period, the system may direct the transaction terminal to delay the transaction for a predetermined wait time before completing the transaction and send an alert notification to law enforcement. Alternatively, the system may (3) determine that the fingerprint scan does not match one of the stored fingerprints, and in response, direct the user device to display a fingerprint rescan message.

In some embodiments, the transaction terminal may be an ATM terminal. In such embodiments, the alert notification sent to law enforcement may include a location of the ATM terminal and GPS data obtained from the user device. In other embodiments, the transaction terminal may be a point-of-sale (POS) terminal.

In some embodiments the alert notification sent to law enforcement may include an indication of when the predetermined wait time will expire. The system may be further configured to receive, from a law enforcement device, a suggested predetermined wait time extension and adjust the predetermined wait time based on the suggested predetermined wait time extension.

In some embodiments, the system may be further configured to direct the ATM terminal to activate one or more audiovisual recording systems (e.g. video camera, audio recorder, or both) that are associated with the ATM terminal in response to determining that the fingerprint scan matches the stored under-duress fingerprint scan. Further, the system may be configured to direct at least one of a plurality of nearby ATM terminals within a predetermined range of the ATM terminal to activate audiovisual monitoring systems associated with the nearby ATM terminal(s).

In some embodiments, the system is further configured to direct the user device to silently activate one or more of an audio recording component and a video recording component of the user device in response to determining that the fingerprint scan matches the stored under-duress fingerprint scan. In some embodiments, the activation of the audio recording and video recording systems on the user device may be performed without providing a visual indication. In some embodiments, the activation of the audio recording and video recording systems may include directing the user device to display a coded message based on a pre-transaction user input.

In some embodiments, the system is further configured to direct the user device to silently provide a confirmation notification of the under-duress transaction signal in the form of a vibration responsive to the system determining that the fingerprint scan matches the stored under-duress fingerprint scan.

In some embodiments, the system is further configured to direct the user device to silently display a coded message based on a pre-transaction user input in response to determining that the fingerprint scan matches the stored under-duress fingerprint scan. The coded message may represent a confirmation of the under-duress transaction signal.

In another aspect, an alarm system for a transaction terminal in disclosed. Specifically, the system may include one or more processors and a memory in communication with the processor(s) and storing instructions that, when executed by the processor(s), are configured to cause the system to perform the steps of a method. For example, the system may receive an authentication request to complete a transaction at the transaction terminal from a user device. The authentication request may include a fingerprint scan obtained via the user device. The system may determine whether the fingerprint scan matches a stored fingerprint associated with the user device. The stored fingerprints may include a stored normal fingerprint scan, a stored under-duress fingerprint scan for sending an under-duress signal, and a stored cancellation fingerprint scan for cancelling the under-duress signal. In response to (1) matching the fingerprint scan with the stored normal fingerprint scan, the system may direct the transaction terminal to complete the transaction. In response to (2) matching the fingerprint scan with the stored under-duress fingerprint scan, the system may determine whether any subsequent fingerprint scan obtained via the user device within a predetermined cancellation time period matches the stored cancellation fingerprint scan. Based on the determination that the under-duress signal is not cancelled, the system may (a) send an alert notification to law enforcement, (b) obtain GPS data from the user device, (c) determine an estimated travel time for law enforcement to arrive at the transaction terminal, and (d) direct the transaction terminal to delay the transaction for a predetermined wait time based on the GPS data and the estimated travel time. In response to (3) not matching the fingerprint scan with one of the stored fingerprints, the system may direct the user device to display a fingerprint rescan message.

In some embodiments, the transaction terminal may be a point-of-sale (POS) terminal and, in response to matching the fingerprint scan with the stored under-duress fingerprint scan, the system is further configured to direct the POS terminal to display a silent alert notification indicating that the transaction is occurring under duress. In other embodiments, the transactional terminal is an ATM terminal and the alert notification sent to law enforcement includes a location of the ATM terminal and the GPS data received from the user device.

In some embodiments, the alert notification sent to law enforcement further includes an indication of when the predetermined wait time will expire. The system may be further configured to receive from a law enforcement device, a suggested predetermined wait time extension and adjust the predetermined wait time based on the suggested predetermined wait time extension.

In yet another aspect, a method for triggering a silent alert for an under-duress transaction at a transaction terminal is disclosed. The method may include receiving, from a user device, an authentication request to complete a transaction at the transaction terminal. The transaction terminal request may include a fingerprint scan obtained via the user device. The method may include determining whether the fingerprint scan matches a stored fingerprint associated with the user device. The stored fingerprints may include a stored normal fingerprint scan, a stored under-duress fingerprint scan corresponding to an under-duress transaction signal, and a stored cancellation fingerprint scan for cancelling the under-duress signal. The method may include directing the transaction terminal to complete the transaction when (1) the fingerprint scan matches with the stored normal fingerprint scan. Alternatively, when (2) the fingerprint scan matches the stored under-duress fingerprint scan, the method may include determining whether a subsequent fingerprint scan obtained by the user device within a predetermined cancellation time period matches the stored cancellation fingerprint scan. Based on a determination that the subsequent fingerprint scan does not match the stored cancellation fingerprint scan within the predetermined cancellation time, the method may include (a) obtaining GPS data from the user device, (b) sending an alert notification to law enforcement, (c) directing the transaction terminal to delay the transaction for a predetermined wait time based on the GPS data, and (d) directing one or more of the transaction terminal and the user mobile device to activate one or more recording systems (i.e., audio recording, visual recording, or both). Alternatively, when (3) the fingerprint scan does not match one of the plurality of stored fingerprints, the method may include directing the user device to display a fingerprint rescan message.

In some embodiments, the transaction terminal includes one or more of an ATM terminal and a point-of-sale (POS) terminal. In some embodiments, the alert notification sent to law enforcement includes a location of the transaction terminal and the GPS data obtained from the user device.

In some embodiments, the method may further include directing the user device to activate one or more recording components (i.e., audio recording, visual recording, or both) of the user device without providing auditory or visual feedback responsive to determining that the fingerprint scan matches the stored under-duress fingerprint scan.

In some embodiments, the method may further include determining an estimated travel time for law enforcement to arrive at the transaction terminal. The method may include determining an appropriate predetermined wait time from a list of potential predetermined wait times based on the GPS data and the estimated travel time and directing the transaction terminal to display one or more predetermined messages associated with the appropriate determined wait time. The one or more predetermined messages may include at least one fake login routine that requires user input to proceed.

Although some of the above embodiments are described with respect to systems, it is contemplated that embodiments with identical or substantially similar features may alternatively be implemented as methods and/or non-transitory computer-readable media, and vice versa.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows a diagram of an exemplary system that may be configured to perform one or more software processes that, when executed, provide a silent transaction terminal alert. The components and arrangements shown in FIG. 1 are not intended to limit the disclosed embodiments as the components used to implement the disclosed processes and features may vary.

In accordance with disclosed embodiments a silent transaction terminal alert system 100 may include a user device 110, a financial service provider system 120, a transaction terminal 130, one or more nearby transaction terminal(s) 140, and a law enforcement device 150, each communicating over a network 160. According to some embodiments, the user device 110 may be associated with a user that desires, based on free will or under duress, to conduct a transaction at a transaction terminal (e.g., a POS terminal or an ATM). In some embodiments, the user may have an account (e.g., a bank account) that is associated with a financial service provider corresponding to the financial service provider system 120. The user device 110 may be connected to the financial service provider system 120, the transaction terminal 130, the nearby transaction terminal 140 and the law enforcement device 150 directly or via the network 160. The financial service provider system 120 may be connected to the transaction terminal 130, the nearby transaction terminal 140, and the law enforcement device 150 directly or via the network 160. Other components known to one of ordinary skill in the art may be included in the silent transaction terminal alert system 100 to process, transmit, provide, and receive information consistent with the disclosed embodiments.

The user device 110 may be a computer-based system. For example, the user device 110 may include a general purpose or notebook computer, a mobile device with computing ability, a server, a desktop computer, tablet, or any combination of these computers and/or affiliated components. The user device 110 may include one or more sensors such as a camera and microphone (i.e., audiovisual monitoring systems), gyroscope and/or a GPS receiver. The user device 110 may be configured with storage that stores one or more operating systems that perform known operating system functions when executing by one or more processors. For example, the operating systems may include Microsoft Windows™, Unix™, Linux™, Apple™ operating systems, Personal Digital Assistant (PDA) type operating systems (e.g. Mircosoft CE™), or other types of operating systems, nonexclusively. Further, the user device 110 may include communication software that, when executed by a processor, provides communications with the network 160, such as web browser software, tablet, or smart handheld device networking software, etc. The user device 110 may be a device that executes mobile applications, such as a tablet or a mobile device. Although reference is made specifically to the user device 110, a person of ordinary skill in the art would understand that the financial service provider system 120, the transaction terminal 130, the nearby transaction terminal 140, and the law enforcement device 150 may have some or all of the components and capabilities of the user device 110.

The financial service provider system 120 may allow a financial service provider, such as a bank, a credit card company, a merchant, a lender, etc., to offer and provide a secure transaction terminal authentication system in order to more effectively secure a user's financial transactions. The financial service provider system 120 may be a computer-based system including computer system components, such as one or more servers, desktop computers, workstations, tablets, hand held computing devices, memory devices, and/or internal network(s) connecting the components. As shown in FIG. 1, the financial service provider system 120 may include a server 122 and/or an authentication database 124. An authentication database 124, which may be an internal or external database with respect to financial service provider system 120, may provide a database of credentials, such as, for example, biometric data (e.g. fingerprint scans), usernames, logins, passwords, pin numbers, account numbers, security questions, and other financial data which may be used to verify the user's identity, ensuring greater security for a user's financial transactions at the transaction terminal 130.

The transaction terminal 130 may be associated with an ATM that may allow a user to withdraw cash from an account associated with a financial service provider. Similarly, the transaction terminal 130 may be associated with a POS terminal that may allow a user to make a payment in exchange for goods or services or withdraw funds in addition to purchasing goods or services. The transaction terminal 130 may include one or more I/O devices that may include one or more interfaces for receiving signals or inputs from devices and providing signals or output to one or more devices that allow data to be received and transmitted by an input device, such as a keyboard or a touch screen. The transaction terminal 130 may be a computer-based system including computer system components, such as one or more servers, desktop computers, workstations, tablets, mobile computing devices, memory devices, and/or internal network(s) connecting the components.

Network 160 may comprise any type of computer networking arrangement used to exchange data. For example, network 160 may be the Internet, a private data network, or a virtual private network using a public network such as the Internet. Network 160 may also include a public switched telephone network ("PSTN") and/or a wireless network.

To communicate over network 160, a computing device associated with user device 110, financial service provider system 120, transaction terminal 130, nearby transaction terminal 140, and law enforcement device 150 may be a mobile computing device (e.g., a smart phone, tablet computer, smart wearable device, or portable laptop computer) or a stationary computing device (e.g., a stationary desktop or laptop computer). Being mobile, in some embodiments, may advantageously allow the user device 110 to communicate with other devices in the system 100 from a predetermined location or area (e.g., at an ATM or POS location).

Figure 2:
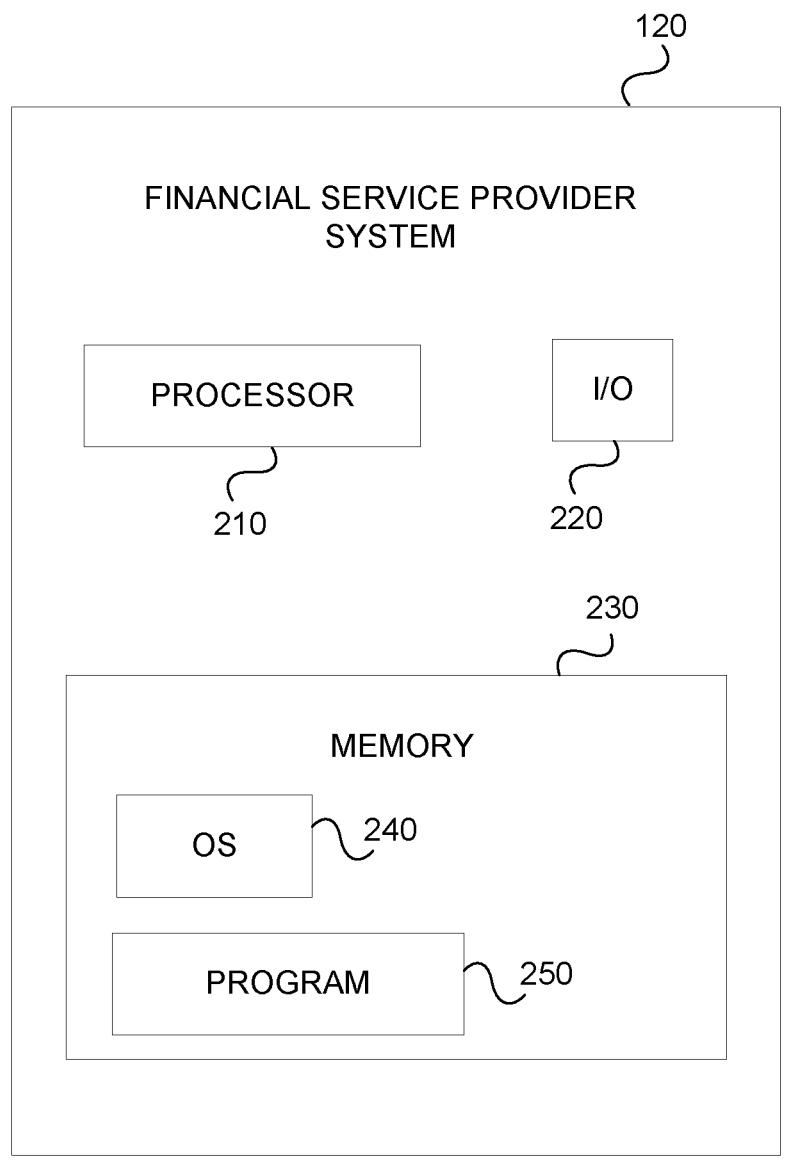
FIG. 2 is a component diagram of an exemplary financial service provider system.

The financial service provider system 120 is shown in more detail in FIG. 2. The user device 110, the transaction terminal 130, the nearby transaction terminal 140, and the law enforcement device 150 all may have a similar structure and components that are similar to those described with respect to financial service provider terminal 120. As shown, financial service provider system 120 may include a processor 210, an input/output ("I/O") device 220, a memory 230 containing an operating system ("OS") 240 and a program 250. For example, financial service provider system 120 may be a single server or may be configured as a distributed computer system including multiple servers or computers that interoperate to perform one or more of the processes and functionalities associated with the disclosed embodiments. In some embodiments, the financial service provider system 120 may further include a display (or a display interface), a peripheral interface, a transceiver, a mobile network interface in communication with the processor 210, a bus configured to facilitate communication between the various components of the financial service provider system 120, and a power source configured to power one or more components of the financial service provider system 120. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The financial service provider terminal may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 120 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Ryzen™ family manufactured by AMD™ Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. In another embodiment, processor 210 may include a multiple-core processor arrangement (e.g., dual or quad core) that is configured to provide parallel processing functionalities to allow server 200 to execute multiple processes simultaneously. One of ordinary skill in the art would understand that other types of processor arrangements could be implemented that provide for the capabilities disclosed herein.

Financial service provider system 120 may include one or more storage devices configured to store information used by processor 210 (or other components) to perform certain functions related to the disclosed embodiments. In one example, financial service provider system 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, financial service provider system 120 includes memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, financial service provider system 120 may include memory 230 that may include one or more programs 250 to perform one or more functions of the disclosed embodiments. Moreover, processor 210 may execute one or more programs 250 located remotely from the silent transaction terminal alert system 100. For example, the system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 230 may include software components that, when executed by processor 210, perform one or more processes consistent with the disclosed embodiments.

Financial service provider system 120 may also be communicatively connected to one or more memory devices (e.g., databases (not shown)) locally or through a network (e.g., network 160). The remote memory devices may be configured to store information and may be accessed and/or managed by financial service provider system 120. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Financial service provider system 120 may also include one or more I/O devices 220 that may comprise one or more interfaces for receiving signals or input from devices and providing signals or output to one or more devices that allow data to be received and/or transmitted by financial service provider system 120. For example, financial service provider system 120 may include interface components, which may provide interfaces to one or more input devices, such as one or more keyboards, mouse devices, touch screens, track pads, trackballs, scroll wheels, digital cameras, microphones, sensors, and the like, that enable financial service provider system 120 to receive data from one or more users. In other exemplary embodiments, the I/O devices 220 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the financial service provider system 120 may include any number of hardware and/or software applications that are executed to facilitate any of the operations. In example implementations, one or more I/O interfaces facilitate communication between the financial service provider system 120 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the financial service provider terminal 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 120 may include a greater or lesser number of components than those illustrated.

Figure 3:
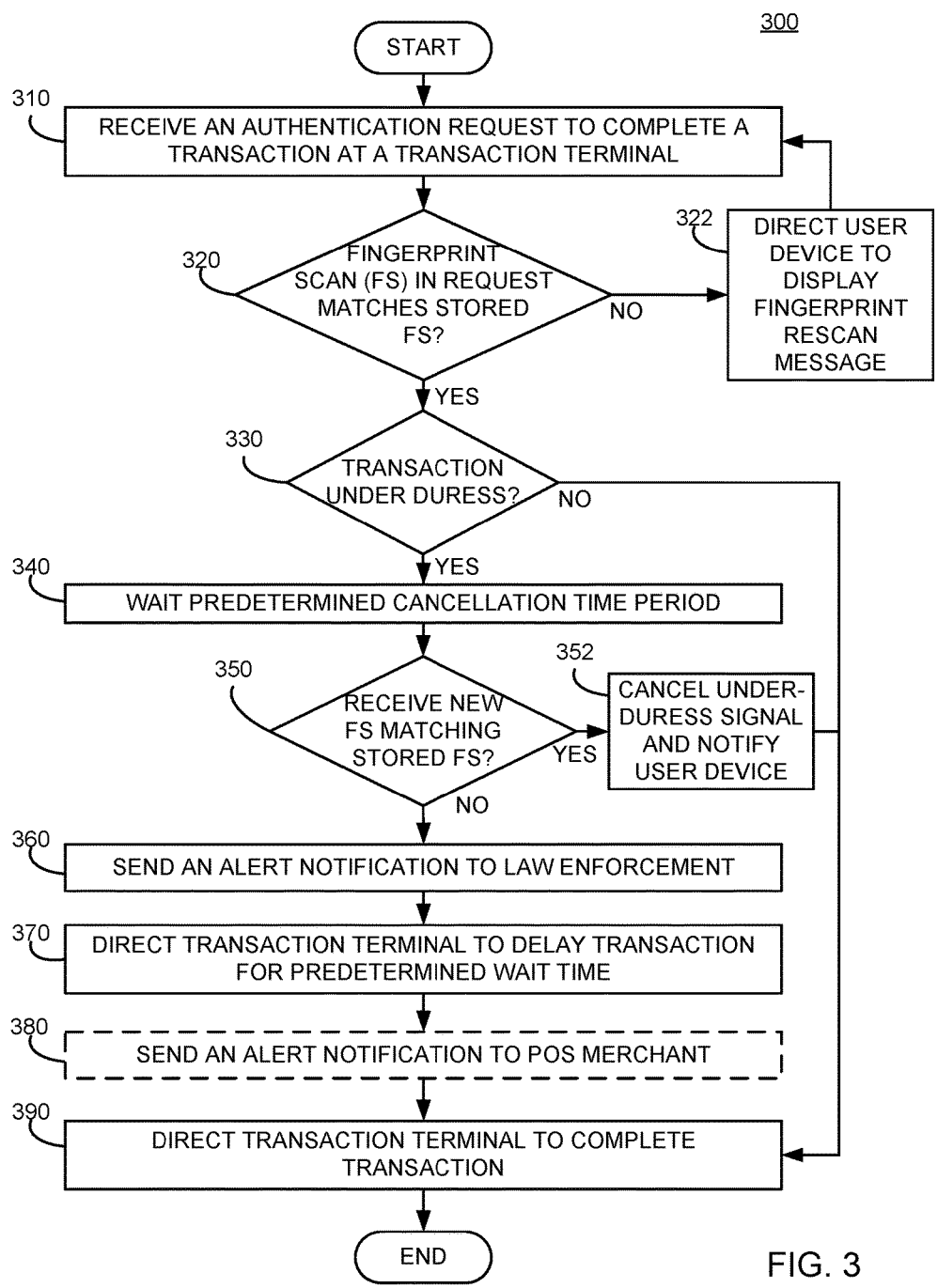
FIG. 3 is a flowchart of an exemplary method of using a silent transaction terminal alert system, according to some embodiments.

FIG. 3 illustrates a diagram of a method of using a silent transaction terminal alert system, according to an exemplary embodiment. As shown, the system 100 (e.g., via the financial service provider system 120) may receive 310 an authentication request to complete a transaction at a transaction terminal from the user device 110. In some embodiments, the authentication request may include (1) a fingerprint scan obtained via the user device 110 and (2) financial account data for a financial account associated with the user device 110. The fingerprint scan obtained with the user device may correspond to one of a plurality of stored fingerprints associated with the user device 110. The stored fingerprints associated with the user device 110 may include a stored normal fingerprint scan (e.g., a right index finger), a stored under-duress fingerprint scan (e.g., a left index finger and/or a right ring finger) for triggering an under-duress transaction signal, and a stored cancellation fingerprint scan (e.g., a left and/or right pinky finger) for cancelling the under-duress transaction signal. In this manner, a group of one or more fingerprints may be assigned to exactly one type of fingerprint scan (e.g., normal, under-duress, or cancellation fingerprint scans) so there is one finger cannot be used for multiple signals. In other embodiments, the same finger (or fingers from the same predetermined group) can be scanned multiple times in succession to trigger and/or cancel and under-duress transaction signal. For example, scanning a user's left index finger once may trigger the under-duress transaction signal and then scanning the same finger again may trigger the cancellation of the under-duress transaction signal. In other embodiments when the user device 110 is capable of detecting the user's heartbeat rate, the authentication request may also include detected heartbeat rate data and the system 100 (e.g., via the financial service provider system 120) may compare the detected heartbeat rate upon receiving a fingerprint scan associated with triggering the under-duress transaction signal with another heartbeat rate associated with the user (e.g., a "normal" heartbeat rate detected during account setup or an average heartbeat detected during a plurality of prior normal transaction fingerprint scans). In such embodiments, the system 100 may only trigger the under-duress transaction signal upon (a) determining that the appropriate finger was scanned and (b) determining that the detected heartbeat rate exceeds a predetermined heartbeat threshold. When the detected heartbeat rate does not exceed the predetermined heartbeat threshold, the system may prompt the user to rescan the fingerprint to confirm that user intends to trigger the under-duress transaction signal and is not inadvertently scanning the wrong finger. The financial account data may include, for example, an account number, a routing number, an account type (e.g., savings, checking, etc.), and the identity of the financial service provider hosting the account.

After receiving the authentication request to complete a transaction at the transaction terminal 130, the system 100 (e.g., via the financial service provider system 120) may determine 320 whether the fingerprint scan in the authentication request matches, beyond a predetermined threshold (e.g., 99% confidence threshold or another threshold set by financial service provider to ensure secure transactions), to a stored fingerprint scan associated with the user device 110. The stored fingerprint scans may include a stored normal fingerprint scan, a stored under-duress fingerprint scan for triggering an under-duress transaction signal, and a stored cancellation fingerprint scan for cancelling the under-duress transaction signal. Responsive to determining that the fingerprint scan in the request does not match the stored fingerprint scan (or that the "match" does not exceed the predetermined threshold), the system 100 (e.g., via the financial service provider system 120) may direct 322 the user device to display a fingerprint rescan message. Alternatively, responsive to determining that the fingerprint scan in the request matches one of the stored fingerprint, the system 100 (e.g., via the financial service provider system 120) may determine 330 whether the transaction is being made under duress. For example, if the fingerprint scan of the request matches, beyond a predetermined confidence threshold, to the stored under-duress fingerprint scan, this may trigger the system 100 (e.g., via the financial service provider system 120) to respond to a transaction under-duress by waiting 340 for a predetermined cancellation time period (e.g., 15 seconds). In some embodiments, the system 100 (e.g., via the financial service provider system 120) may silently notify (e.g., via vibration of the user device 110 or message for display on the user device 110 and/or the transaction terminal 130) the user that the transaction under-duress signal will be triggered once the predetermined cancellation time period lapses. The purpose of the cancellation period may be to allow the user to cancel the under-duress transaction signal by providing, via the user device 110, the stored cancellation fingerprint scan if the under-duress fingerprint scan in the request was made in error (e.g., the user forgot or inadvertently scanned the wrong finger). Alternatively, the system 100 (e.g., via the financial service provider system 120) may determine 330 that the transaction is not being conducted under-duress when the fingerprint scan in the authentication request is determined to match, beyond the predetermined threshold, the stored normal fingerprint scan and, in response, direct the transaction terminal 130 to complete the transaction 390.

During the predetermined cancellation time period of block 340 (in response to a positive indication of a transaction under-duress in block 330, the system 100 (e.g., via the financial service provider system 120) may receive (e.g., from the user device 110) a new fingerprint scan 350 to either confirm or cancel an under-duress transaction. In response to receiving the stored cancellation fingerprint scan at block 350, the system 100 (e.g., via the financial service provider system 120) may cancel 352 the under-duress signal and notify the user device 110 that the under-duress transaction has been cancelled. Further, the system 100 (e.g., via the financial service provider system 120) may direct the transaction terminal 130 to complete the transaction 390.

In response to not receiving a new fingerprint scan and determining that it matches the stored cancellation fingerprint scan at block 350 within the predetermined cancellation time, the system 100 (e.g., via the financial service provider system 120) may trigger protocol for an under-duress transaction. For example, in some embodiments, the system 100 (e.g., via the financial service provider system 120) may be further configured to direct the user device 110 to silently activate, for a predetermined recording time, audio recording components of the user device 110, video recording components of the user device 110, or both. In other embodiments, the system 100 (e.g., via the financial service provider system 120) may direct the user device 110 to display a coded message based on pre-transaction user input in response to activation of one or more of the audio or video recording components of the user device 110. This may be advantageous to notify the user when the video and audio recordings have been automatically triggered in response to an under-duress transaction. Since the coded message is based on pre-transaction user input, the user may notice the coded message and understand its meaning while a third party would not understand the meaning of the coded message even if the third party noticed it. In further embodiments, the system 100 (e.g., via the financial service provider system 120) may direct the user device 110 to silently provide a confirmation notification of the under-duress transaction signal. The confirmation notification of the under-duress transaction signal may take the form of a vibration signal of the user device 110. In other embodiments, the confirmation notification of the under-duress transaction signal may take the form of a non-discreet icon that pops up on the user's mobile device. In some embodiments, the user may be equipped with a wearable device (e.g., smart glasses) and the conformation notification of the under-duress transaction signal may consist of a visual alert to the wearable device. In some embodiments the transaction terminal 130 and nearby transaction terminal 140 may include an ATM terminal and a nearby ATM terminal respectively. In other embodiments, the system 100 (e.g., via the financial service provider system 120) may (a) direct the transaction terminal (e.g., an ATM) to activate one or more of its audiovisual recording systems and (b) direct at least one nearby transaction terminal (e.g., another ATM) within a predetermined range of the transaction terminal to activate one or more of its audiovisual recording systems. In further embodiments, the system 100 (e.g., via the financial service provider system 120) may direct the user device 110 to silently display a coded message based on a pre-transaction under input indicating a confirmation of the under-duress signal. For example, a user of the system 100 may input a coded word prior to the transaction which, in the case of a transaction under duress will be displayed on the user device 110 to indicate to the user that he or she has successfully activated the under-duress transaction, assuring the user that law enforcement will soon arrive at the transaction terminal 130 to provide assistance.

In block 360, the system 100 (e.g., via the financial service provider terminal 120 or the user device 110) may send an alert notification to the law enforcement device 150. The alert notification may include the location of the transaction terminal 120 and the GPS data obtained from the user device 110, enabling law enforcement to quickly locate the user during an under-duress transaction. In some embodiments, the system 100 (e.g., via the financial service provider terminal 120 or the user device 110) may additionally send an alert notification to security guards who may be employed by the transaction terminal 130 provider.

Figure 4:
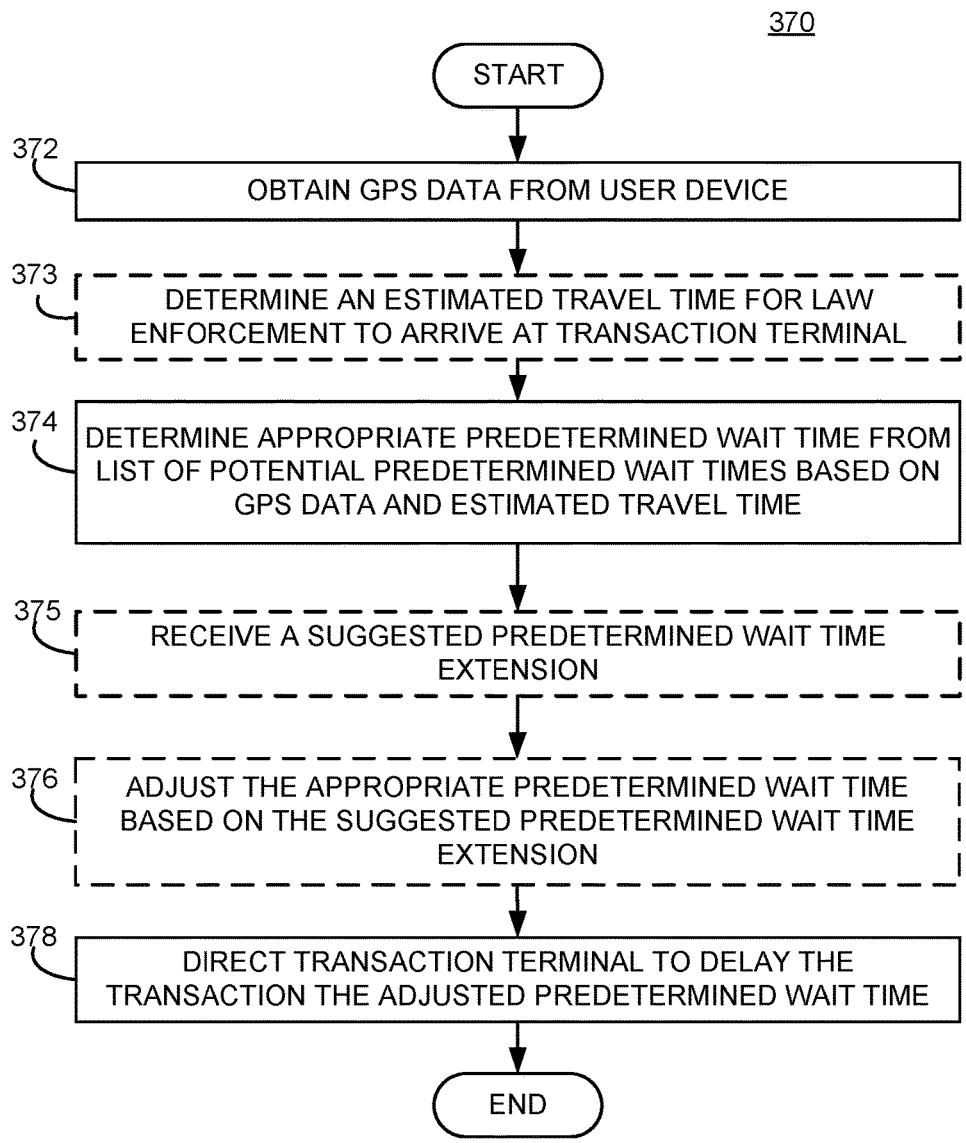
FIG. 4 is a flowchart of an exemplary method of adjusting the predetermined wait time for conducting a transaction made under duress using the silent transaction terminal alert system, according to some embodiments.

In block 370, the system 100 (e.g., via financial service provider system 120) may direct the transaction terminal 130 to delay the transaction for a predetermined wait time and may adjust the wait time or enable a user to delay the wait time, as described in more detail with respect to FIG. 4. For example, as shown in block 372, the system 100 (e.g., via financial service provider system 120) may obtain GPS data from the user device 110. In turn, as previously described with respect to sending an alert notification to the law enforcement device 150 in block 360, the system 100 (e.g., via the financial service provider system 120) may send the GPS data to the law enforcement device 150 as part of the alert notification.

Then, in block 373, the system 100 (e.g., via the financial service provider 120) may optionally determine an estimated travel time for law enforcement (e.g., associated with law enforcement device 150) to arrive at the transaction terminal 130 and/or to the user device 110. For example, the system 100 may use an online travel/directions service to estimate a travel time (e.g., using real-time or historical traffic data) or it may have stored estimated travel times associated with various transaction terminals and nearby law enforcement stations and determine which stored estimated travel time applies based on the GPS data and/or the position of the transaction terminal. In block 374, the system 100 (e.g., via the financial service provider system 120) may determine an appropriate predetermined wait time from a list of potential predetermined wait times. The appropriate predetermined wait time may be based on GPS data obtained from the user device 110 as well as the estimated travel time determined in block 373. In some embodiments, the appropriate predetermined wait time (e.g., 4 minutes) may balance the estimated travel time (e.g., 6 minutes) with a realistic time window for processing the transaction (e.g., 2 minutes) so as not to alert the third party. The system 100 (e.g., via the financial service provider system 120) may tactfully delay the transaction so as not to draw the attention of the third party via decoy or fake prompts (e.g., to rescan the fingerprint, system processing, enter or re-enter password, etc.) that take time to complete but do not impact the transaction.

Optionally, the system 100 (e.g., via the financial service provider system 120) may receive 375 a suggested wait time extension. For example, the system 100 may provide the appropriate predetermined wait time (e.g., 4 minutes) as part of the alert notification sent to the law enforcement device 150 and, in response, receive a suggested wait time extension (e.g., 1 minute) from the law enforcement device 150. Law enforcement personnel may have more expertise and insight on their response time based on traffic, proximity of other law enforcement personnel, etc. In some embodiments, the suggested wait time extension may be a negative duration (e.g., −1 minute), such as when law enforcement personnel expects to arrive earlier than the estimate travel time. In block 376, the system 100 (e.g., via the financial service provider system 120) may optionally adjust the predetermined wait time based on the suggested predetermined wait time extension. Finally, the system 100 (e.g., via the financial service provider system 120) may direct the transaction terminal 130 to delay the transaction the adjusted predetermined wait time.

Returning to block 380 of FIG. 4, after directing the transaction terminal 130 to delay the transaction for the predetermined wait time (or the adjusted predetermined wait time), the system 100 (e.g., via the financial service provider system 120) may send 380 an alert notification to an attendant proximate the transaction terminal (e.g., to a merchant or cashier at a POS terminal). This may allow the merchant to take action to assist the user and/or to avoid other customers from interfering in a manner that would increase the risk for the user, another customer, or the merchant.

Once the system 100 (e.g., via the financial service provider system 120) has directed 370 the transaction terminal to delay the transaction for a predetermined wait time (or the adjusted predetermined wait time) and that wait time has expired, it may direct 390 the transaction terminal 130 to complete the transaction. Importantly, regardless of whether the system 100 is processing a normal transaction or a transaction under duress, the transaction terminal 130 will be directed to complete the transaction (e.g., issue the funds being withdrawn) so as not to alert the third party assailant that law enforcement has been notified.

Exemplary Use Cases

The following exemplary use case describes just one example of a typical user flow pattern. It is intended solely for explanatory purposes and not in limitation. In this example, a user may wish to make a purchase at a POS terminal 130. While in the checkout line at their favorite electronics big-box store, the user may be confronted by an assailant with the purpose of coercing the user to make a purchase on behalf of the assailant. To avoid unnecessarily escalating the confrontation, it may be advantageous for the user to silently alert the proper authorities without providing any indication of such to the assailant. To accomplish this objective, the user may proceed with initiating the transaction, starting with scanning the user's fingerprint and sending it as part of an authentication request (e.g., via the user device 110) to complete a transaction at the POS terminal 130. In turn, the system 100 (e.g., via the financial service provider system 120) may receive the user's authentication request and determine whether the fingerprint scan matches one of the stored fingerprint scans associated with the user device 110. That is, the user may have stored fingerprint scans of his index finger, ring finger, and pinky finger ahead of the confrontation, and the system 100 may determine whether the received fingerprint scan matches any of those stored fingerprint scans. Because the user is being coerced by his assailant for purposes of this example, the provided fingerprint should match the stored under-duress fingerprint scan. In response to matching the user's stored under-duress fingerprint, the system 100 (e.g., via the financial service provider system 120) may silently notify the user (e.g., by a series of vibrations of the user device 110 known to the user but not the assailant) that an under-duress alert signal will be triggered and initiate a predetermined cancellation time period to allow the user to cancel an under-duress alert signal (e.g., in case the wrong finger was scanned by mistake). Here, the user intended to trigger the under-duress alert signal and elects not to provide another fingerprint scan. In response, the system 100 (e.g., via the financial service provider system 120) may direct the POS terminal 103 or another merchant device associated with the POS terminal (e.g., a display screen for a merchant overseeing several POS terminals) to display a silent alert notification indicating that the transaction is occurring under duress. Notifying the participating merchant may be helpful in protecting the user, the merchant, and other customers.

Next, the system 100 (e.g., via the financial service provider system 120) may silently provide a confirmation to the user indicating that the user has successfully activated an under-duress transaction. This may take the form of another silent vibration alert of the user device 110, or in other embodiments, a coded message based on a pre-transaction user input for display on the user device 110. In some embodiments, the system 100 (e.g., via the financial service provider system 120 and/or the user device 120) may send an alert notification to the law enforcement device 150. The alert notification sent to law enforcement may include one or more of GPS data obtained from the user device 110, an estimated travel time for law enforcement to arrive at the POS terminal 130 or user device 110, and an appropriate predetermined wait time determined by the system 100. Law enforcement may, in turn, suggest extending the wait time to allow more (or less) time for law enforcement personnel to arrive. Factoring in any suggested predetermined wait time extension from law enforcement, the system 100 (e.g., via the financial service provider system 120) may adjust the wait time and direct the POS terminal 130 to delay the transaction for the adjusted predetermined wait time. Meanwhile, as the user waits for law enforcement to arrive on the scene, it may be advantageous for the user device 110, the POS terminal 130, and/or nearby POS terminals to automatically begin recording audio, video, or both in an effort to document the under-duress transaction and assist law enforcement. Accordingly, the system 100 may direct one or more of the user device 110, POS terminal 130, and/or nearby POS terminals 140 to automatically record audio and/or video indefinitely or for a predetermined time window. All the while, from the assailant's perspective, the transaction appears normal. If appropriate based on the adjusted predetermined wait time, the system 100 may prompt the user with decoy screens to rescan his fingerprint or enter his security question(s) to complete the transaction, which have no impact on the transaction itself but may help convince the assailant that the transaction is proceeding normally. In the current example, only the user device 110, the merchant POS terminal 130, and the law enforcement device 150 may be affirmatively notified of the under-duress transaction without any indication given to the assailant.

In another exemplary use case, the transaction terminal may be an ATM. A user may wish to withdraw cash from his financial account, which is associated with his user device 110. While approaching the ATM, the user encounters an assailant and wishes to trigger an under-duress transaction alert. To do this, the user would scan his finger associated with his stored under-duress fingerprint, and provide that fingerprint scan as part of a authentication request. If the user discovers that the assailant is in fact harmless, the user may deactivate the under-duress transaction during a cancellation time period. Otherwise, the system 100 (e.g., via the financial service provider system 120) may proceed with alerting law enforcement of the under-duress transaction. As part of this, in some embodiments, the system 100 (e.g., via the financial service provider system 120) may direct the user device 110, the ATM 130, and/or any nearby ATMs 140 to activate their audiovisual recording systems to capture video and/or audio footage of the transaction to assist law enforcement. Additionally, as described above, the system 100 (e.g., via the financial service provider system 120) may direct the ATM 130 to delay the transaction for a predetermined or adjusted wait time, and may prompt the user with decoy or fake screens on the user device 110 or the ATM to discretely delay the transaction in a manner that does not draw the attention of the assailant and allows law enforcement to arrive at the scene.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transaction terminal silent alert system comprising:
one or more processors; and
a memory in communication with the one or more processors and storing instructions that, when executed by the one or more processors, are configured to cause the system to:
  receive, from a user device, an authentication request to complete a transaction at a transaction terminal, the authentication request comprising a fingerprint scan obtained via the user device and financial account data for a financial account associated with the user device;
  determine whether the fingerprint scan matches, beyond a predetermined confidence threshold, one of a plurality of stored fingerprints associated with the user device, wherein the plurality of stored fingerprints comprises a stored normal fingerprint scan, a stored under-duress fingerprint scan for triggering an under-duress transaction signal, and a stored cancellation fingerprint scan for cancelling the under-duress transaction signal;
  responsive to determining that the fingerprint scan matches the stored normal fingerprint scan, direct the transaction terminal to complete the transaction;
  responsive to determining that the fingerprint scan matches the stored under-duress fingerprint scan:
    direct the transaction terminal to delay the transaction a predetermined cancellation time period within which the under-duress transaction signal can be cancelled;
    responsive to receiving a subsequent fingerprint scan from the user device within the cancellation time period, determine whether the subsequent fingerprint scan matches the stored cancellation fingerprint scan beyond the predetermined confidence threshold and, based on the determination, direct the transaction terminal to complete the transaction and direct the user device to display an under-duress transaction signal cancellation message; and
    responsive to not receiving the subsequent fingerprint scan within the predetermined cancellation time period, direct the transaction terminal to delay the transaction for a predetermined wait time before completing the transaction and send an alert notification to law enforcement; and
  responsive to determining that the fingerprint scan does not match one of the plurality of stored fingerprints beyond the predetermined confidence threshold, direct the user device to display a fingerprint rescan message.

2. The system of claim 1, wherein the transaction terminal is an ATM.

3. The system of claim 2, wherein the alert notification sent to law enforcement comprises a location of the ATM and GPS data obtained from the user device.

4. The system of claim 3, wherein the alert notification sent to law enforcement further comprises an indication of when the predetermined wait time will expire, the system being further configured to:
  receive, from a law enforcement device, a suggested predetermined wait time extension; and
  adjust the predetermined wait time based on the suggested predetermined wait time extension.

5. The system of claim 2, wherein responsive to determining that the fingerprint scan matches the stored under-duress fingerprint scan, the system is further configured to direct the ATM to activate one or more audiovisual recording systems associated with the ATM and to direct at least one of a plurality of nearby ATMs within a predetermined range of the ATM to activate one or more nearby audiovisual recording systems associated with the at least one nearby ATM.

6. The system of claim 1, wherein responsive to determining that the fingerprint scan matches the stored under-duress fingerprint scan, the system is further configured to direct the user device to silently activate, for a predetermined record time, one or more of an audio recording component of the user device and a video recording component of the user device.

7. The system of claim 6, wherein activation of one or more of the audio recording system and the video recording system is performed without providing a visual indication.

8. The system of claim 6, wherein activation of one or more of the audio recording system and the video recording system comprises directing the user device to display a coded message based on pre-transaction user input.

9. The system of claim 2, wherein responsive to determining that the fingerprint scan matches the stored under-duress fingerprint scan, the system is further configured to direct the user device to silently provide a confirmation notification of the under-duress transaction signal, the confirmation notification comprising a predetermined vibration signal.

10. The system of claim 2, wherein responsive to determining that the fingerprint scan matches the stored under-duress fingerprint scan, the system is further configured to direct the user device to silently display a coded message based on a pre-transaction user input, the coded message representing a confirmation of the under-duress transaction signal.

11. The system of claim 1, wherein the transaction terminal is a point-of-sale (POS) terminal.

12. An alert system for a transaction terminal, the system comprising:
one or more processors; and a memory in communication with the one or more processors and storing instructions that, when executed by the one or more processors, are configured to cause the system to:
  receive, from a user device, an authentication request to complete a transaction at the transaction terminal, the authentication request comprising a fingerprint scan obtained via the user device;
  determine whether the fingerprint scan matches one of a plurality of stored fingerprints associated with the user device, wherein the plurality of stored fingerprints comprises a stored normal fingerprint scan, a stored under-duress fingerprint scan for sending an under-duress signal, and a stored cancellation fingerprint scan for cancelling the under-duress signal;
  responsive to matching the fingerprint scan with the stored normal fingerprint scan, direct the transaction terminal to complete the transaction;
  responsive to matching the fingerprint scan with the stored under-duress fingerprint scan, determine whether any subsequent fingerprint scan obtained via the user device within a predetermined cancellation time period matches the stored cancellation fingerprint scan and, based on the determination:
    send an alert notification to law enforcement;
    obtain GPS data from the user device;
    determine an estimated travel time for law enforcement to arrive at the transaction terminal; and
    direct the transaction terminal to delay the transaction for a predetermined wait time based on the GPS data and the estimated travel time; and
  responsive to not matching the fingerprint scan with one of the plurality of stored fingerprints, direct the user device to display a fingerprint rescan message.

13. The system of claim 12, wherein the transaction terminal is a point-of-sale (POS) terminal and, responsive to matching the fingerprint scan with the stored under-duress fingerprint scan, the system is further configured to direct the POS terminal to display a silent alert notification indicating that the transaction is occurring under duress.

14. The system of claim 12, wherein the transaction terminal is an ATM and the alert notification sent to law enforcement comprises a location of the ATM and the GPS data received from the user device.

15. The system of claim 14, wherein the alert notification sent to law enforcement further comprises an indication of when the predetermined wait time will expire, the system being further configured to:
  receive, from a law enforcement device, a suggested predetermined wait time extension; and
  adjust the predetermined wait time based on the suggested predetermined wait time extension.

16. A method for triggering a silent alert for an under-duress transaction at a transaction terminal, the method comprising:
  receiving, from a user device, an authentication request to complete a transaction at the transaction terminal, the transaction authentication request comprising a fingerprint scan obtained via the user device;
  determining whether the fingerprint scan matches one of a plurality of stored fingerprints associated with the user device, wherein the plurality of stored fingerprints comprises a stored normal fingerprint scan, a stored under-duress fingerprint scan corresponding to an under-duress transaction signal, and a stored cancellation fingerprint scan for cancelling the under-duress transaction signal;
  when the fingerprint scan matches the stored normal fingerprint scan, directing the transaction terminal to complete the transaction;
  when the fingerprint scan matches the stored under-duress fingerprint scan, determining whether a subsequent fingerprint scan obtained by the user device within a predetermined cancellation time period matches the stored cancellation fingerprint scan and, based on the determination:
    obtaining GPS data from the user device;
    sending an alert notification to law enforcement;
    directing the transaction terminal to delay the transaction for a predetermined wait time based on the GPS data; and
    directing one or more of the transaction terminal and the user mobile device to activate one or more recording systems; and
  when the fingerprint scan does not match one of the plurality of stored fingerprints, directing the user device to display a fingerprint rescan message.

17. The method of claim 16, wherein the transaction terminal comprises one or more of an ATM and a point-of-sale (POS) terminal.

18. The method of claim 17, wherein the alert notification sent to law enforcement comprises a location of the transaction terminal and the GPS data obtained from the user device.

19. The method of claim 17 further comprising, responsive to determining that the fingerprint scan matches the stored under-duress fingerprint scan, directing the user device to activate one or more recording components of the user device without providing auditory or visual feedback.

20. The method of claim 17 further comprising determining an estimated travel time for law enforcement to arrive at the transaction terminal, wherein directing the transaction terminal to delay the transaction further comprises:
  determining an appropriate predetermined wait time from a list of potential predetermined wait times based on the GPS data and the estimated travel time;
  directing the transaction terminal to display one or more predetermined messages associated with the appropriate determined wait time, the one or more predetermined messages comprising at least one fake login routine that requires user input to proceed.

* * * * *